(12) United States Patent
Clatch

(10) Patent No.: US 12,036,851 B1
(45) Date of Patent: Jul. 16, 2024

(54) ARTICULATING HINGE FOR STEP OVER TO EXIT AUTOMOBILE DOORS

(71) Applicant: Richard J Clatch, Libertyville, IL (US)

(72) Inventor: Richard J Clatch, Libertyville, IL (US)

( * ) Notice: Subject to any disclaimer, the term of this patent is extended or adjusted under 35 U.S.C. 154(b) by 286 days.

(21) Appl. No.: 17/854,598

(22) Filed: Jun. 30, 2022

Related U.S. Application Data

(60) Provisional application No. 63/293,675, filed on Dec. 24, 2021.

(51) Int. Cl.
 *B60J 5/04* (2006.01)
 *E05F 1/10* (2006.01)

(52) U.S. Cl.
 CPC ........... *B60J 5/0473* (2013.01); *E05F 1/1008* (2013.01); *E05Y 2900/50* (2013.01)

(58) Field of Classification Search
 CPC ............... B60J 5/0473; E05Y 2900/50; E05Y 2900/531; E05F 1/06; E05F 1/08; E05F 1/1246; B62D 25/025; E05D 15/101; E05D 15/1021
 USPC ....................................... 296/146.11, 146.12
 See application file for complete search history.

(56) References Cited

U.S. PATENT DOCUMENTS

| | | | |
|---|---|---|---|
| 4,079,815 A | 3/1978 | Cormier | |
| 6,030,025 A * | 2/2000 | Kanerva | E05D 3/147 49/248 |
| 6,817,065 B1 * | 11/2004 | Bruckner | E05D 7/04 16/382 |
| 9,452,703 B2 | 9/2016 | Weiner et al. | |
| 9,527,371 B2 | 12/2016 | Flores | |
| 10,648,210 B1 * | 5/2020 | Targhi | E05D 3/18 |
| 2001/0039762 A1 | 11/2001 | Giovannetti | |
| 2002/0073507 A1 * | 6/2002 | Presley | E05D 3/145 16/333 |
| 2007/0145774 A1 * | 6/2007 | Plavetich | B60J 5/047 296/146.11 |
| 2012/0212006 A1 * | 8/2012 | Coldre | B60J 5/0473 296/146.4 |
| 2019/0061489 A1 * | 2/2019 | Hoggarth | B60J 5/06 |
| 2023/0121910 A1 * | 4/2023 | Diephuis | B60J 5/0473 296/146.1 |
| 2023/0191883 A1 * | 6/2023 | Kume | E05D 15/101 16/336 |
| 2024/0066960 A1 * | 2/2024 | Kang | E05F 15/63 |

FOREIGN PATENT DOCUMENTS

| | | |
|---|---|---|
| CN | 202320103 U | 7/2012 |
| DE | 4103651 C1 | 8/1992 |
| DE | 10203539 | 1/2010 |
| DE | 102018202386 A1 | 8/2019 |
| DE | 102018219092 A1 | 11/2019 |

(Continued)

*Primary Examiner* — Gregory A Blankenship
(74) *Attorney, Agent, or Firm* — LESLEY A. WALLERSTEIN, LLC

(57) ABSTRACT

This is a hinge that simultaneously articulates two substantially planar surfaces forward, outward and downward, in an arc, relative to one another. The hinge can be attached to, and move, any two substantially planar surfaces. It is especially useful when attaching a door to a car with side exhaust pipes. When I choose a door that curves inwardly toward the interior of the car, and attach the inventive hinge, the curve of the door physically covers the exhaust pipe and exhaust gas.

10 Claims, 28 Drawing Sheets

(56) References Cited

FOREIGN PATENT DOCUMENTS

| EP | 1308375 | A2 |   | 5/2003 |           |
|----|---------|----|---|--------|-----------|
| EP | 1568529 | A1 | * | 8/2005 | B60J 5/0473 |
| FR | 2822756 | A1 |   | 10/2002 |          |
| GB | 855619  | A  |   | 12/1960 |          |
| GB | 1020521 | A  |   | 2/1966  |          |
| RU | 2122497 | C1 |   | 11/1998 |          |

\* cited by examiner

ARTICULATING HINGE FOR STEP OVER TO EXIT AUTOMOBILE DOORS

CROSS REFERENCE TO RELATED APPLICATION

This application claims priority to U.S. Provisional Patent Application 63/293,675, filed Dec. 24, 2021

FIELD OF THE INVENTION

This is a hinge that simultaneously articulates two substantially planar surfaces forward, outward and downward, in an arc, relative to one another. The hinge can be attached to, and move, any two substantially planar surfaces. It is especially useful when attaching a door to a car with side exhaust pipes. When I choose a door that curves inwardly toward the interior of the car, and attach the inventive hinge, the curve of the door physically covers the exhaust pipe and exhaust gas.

BACKGROUND OF THE INVENTION

Cars with side exhaust pipes (usually vintage or replica vintage sport cars) are hazardous to the occupants. Most car doors swing outward from a forward simple hinge. For cars with exhaust pipes in the rear, this is a satisfactory arrangement. However, in cars with side exhaust pipes, pipes are usually positioned directly below the driver's side door and also the front passenger's side door. When exiting the car, a person's legs typically swing down dangerously close to, if not right against, the pipe or exhaust. Typical exhaust gas and pipes can reach temperatures up to 1500 Fahrenheit. This creates a huge risk of leg burns, well known among vintage sports car enthusiasts.

To solve this problem and make these cars safer, I have created a unique articulating hinge that, when connected to a curved door, opens forward, outward, and downward, in an arc, such that the curve of the door physically covers the exhaust pipe. The person steps over, instead of behind, this door, protecting them from the hot pipe and exhaust. The hinge system may or may not additionally provide forward, backward, or rotational (roll axis) movement to the door, as desired given the geometry of the particular car.

One hinge is sufficient to articulate the two surfaces in an arc. Additional hinges can be attached in series to further stabilize the arc of movement. Each hinge comprises a planar quadrilateral linkage with a pair of opposing ends and a pair of opposing arms, connected by four pivoting joints. Fixed to the first end of the quadrilateral linkage, there is a means for attaching and canting this first end at an acute angle relative to the first of the two surfaces. Fixed to the opposite end of the quadrilateral linkage, there is a means for attaching and canting this second end at an obtuse and supplementary angle relative to the second of the two surfaces. In a first embodiment, the attaching and canting means is a bracket. In a second embodiment, the attaching and canting means is a rigid, longitudinal, and unitary hybrid bracket that is bent at identical angles. In a third embodiment, not shown, the attaching and canting means is a solid triangular prism. In a fourth embodiment, not shown, the hinge brackets could have a right angle, so that the parallelogram hinge has a rectangular or square footprint. In a fifth embodiment, the position of the brackets could be reversed if one wanted the door to move backward, instead of forward, when opened. In all embodiments, the bracket, unitary hybrid bracket, or prism are attached to the first surface and the second surface with common hardware like nuts, bolts, and washers. I can optionally install a tension spring into the hinge to enhance control of vertical movement.

BRIEF SUMMARY OF THE INVENTION

The geometry of the quadrilateral determines the direction and degree of movement between the first and the second surfaces. In its simplest form, the quadrilateral linkage is a parallelogram, where the opposing ends are the same length and the opposing arms are the same length, although not necessarily the same length as the ends. By changing the length of any of the ends or the arms to deviate from a perfect parallelogram, such as into a trapezoid, one can also control the roll axis rotation of the second surface relative to the first surface. By shortening the end mounted to the second surface, which is oriented at an obtuse angle, the lower edge of the second surface will roll or curve inward (not parallel). Conversely, by lengthening this one end, the lower edge of the second surface can be made to roll outward as the door opens. Even more complex and dynamic rotational movements of the door can be achieved by changing the length of the arms. When the first surface is the frame of a car, and the second surface is a door, the door can be opened and closed in an arcuate fashion, parallel to the frame, rolling toward the frame, or away from the frame.

To simplify visualizing the hinge, it helps to imagine the first surface as remaining stationary, and the second surface as the one that moves in relation thereto. When the quadrilateral is a perfect parallelogram, raising the second surface also draws it further inward, and backward relative to the first surface, in an arc. The two surfaces remain parallel to each other. This movement also eventually closes the distance between the two parallel arms. Lowering the second surface brings it further outward, and further forward relative to the first surface, also following an arc. Again, the two surfaces remain parallel to each other. This movement also closes the distance between the two parallel arms. The greater the distance between the two arms, the longer the arc. When the first surface is the frame of a car with a side exhaust pipe, and the second surface is a door, the forward movement of the door upon opening is desirable to accommodate the rear wheel cover. The rear wheel cover would block the movement of a door that opened only straight outward and downward.

In other, non-automotive, applications, the hinge brackets could be oriented at a right angle, or even angled backward if backward movement of the door upon opening is desired. A further, and significant, advantage of a simple parallelogram system is that the hinge arms abut one another when the car door is either open or closed, desirably limiting and controlling the movement of the door.

As shown in the second embodiment, when used in a car, the canting means can also be a unitary hybrid bracket that duplicates the position and angles of individual brackets working in tandem. Having one rather than two pieces to manufacture and install into a car would greatly simplify and reduce labor costs.

REFERENCE NUMERALS

Figure 1:
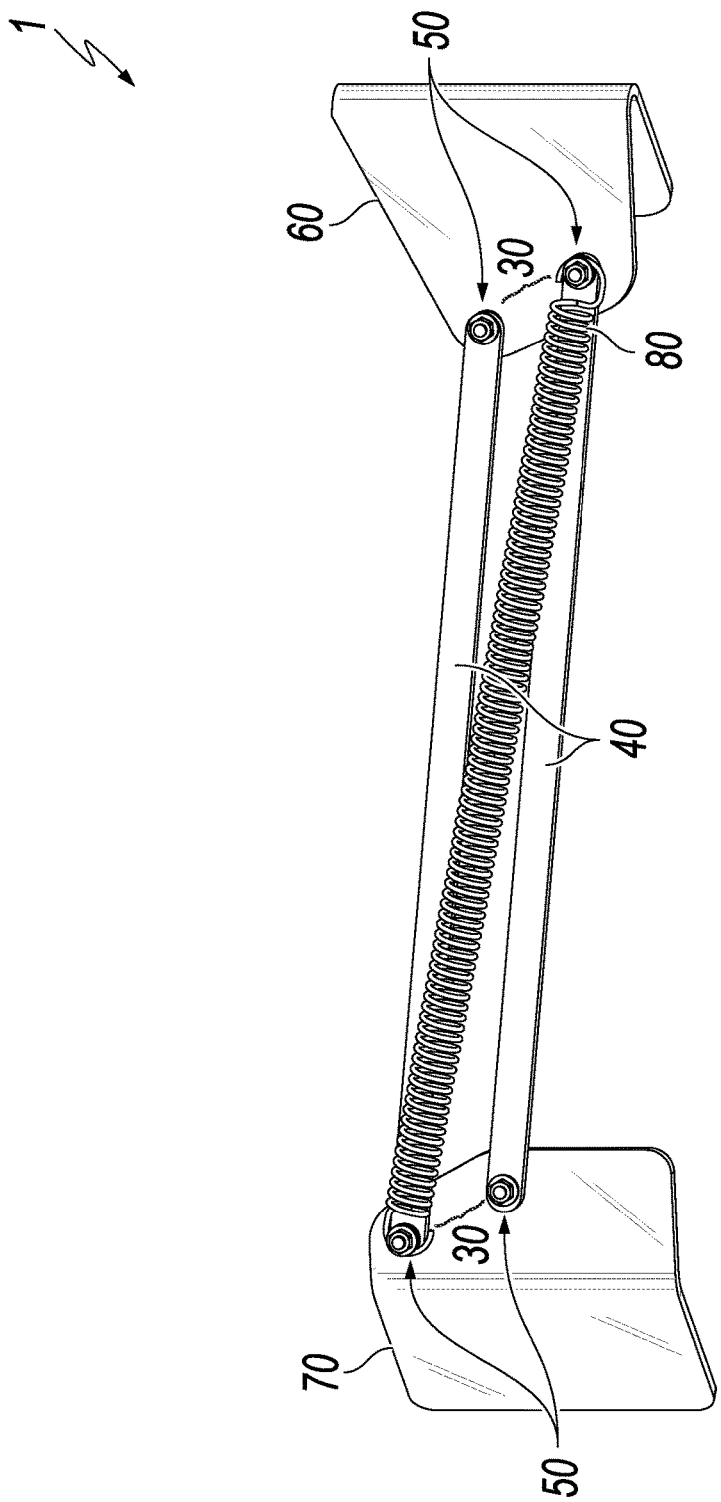
FIG. 1 is a bottom perspective view of a first embodiment of the invention, shown with a spring.

1 Hinge
10 First planar surface
20 Second planar surface
30 End
40 Arm
50 Pivoting joint
60 Acute angle bracket
70 Obtuse angle bracket
75 Unitary hybrid bracket
80 Spring
90 Car body
100 Exhaust pipes
110 Car door

DETAILED DESCRIPTION OF THE INVENTION

FIG. 1 shows a bottom perspective view of a first embodiment of the invention, shown not attached to any surface. Note the quadrilateral is a parallelogram defined by a pair of parallel arms 40 and opposing ends 30. Ends 30 represent the distance between the arms and form part of the brackets 60 and 70. Bracket 60 comprises end 30 extended lengthwise and widthwise into a flat plane, which is then bent to form an acute angle. Bracket 70 comprises the second and opposing end 30, also extended lengthwise and widthwise into a flat plane, then bent to form an obtuse angle. Preferably, the acute angle measures 45 degrees and the obtuse angle measures 135 degrees. One skilled in the art can vary these angles as long as they are supplementary to each other. The angles can even hypothetically be 90 degrees, if you were to employ gimbal expansion joints in at least two corners of the quadrilateral, instead of simple pivoting joints at the four corners of the hinge.

Figure 2:
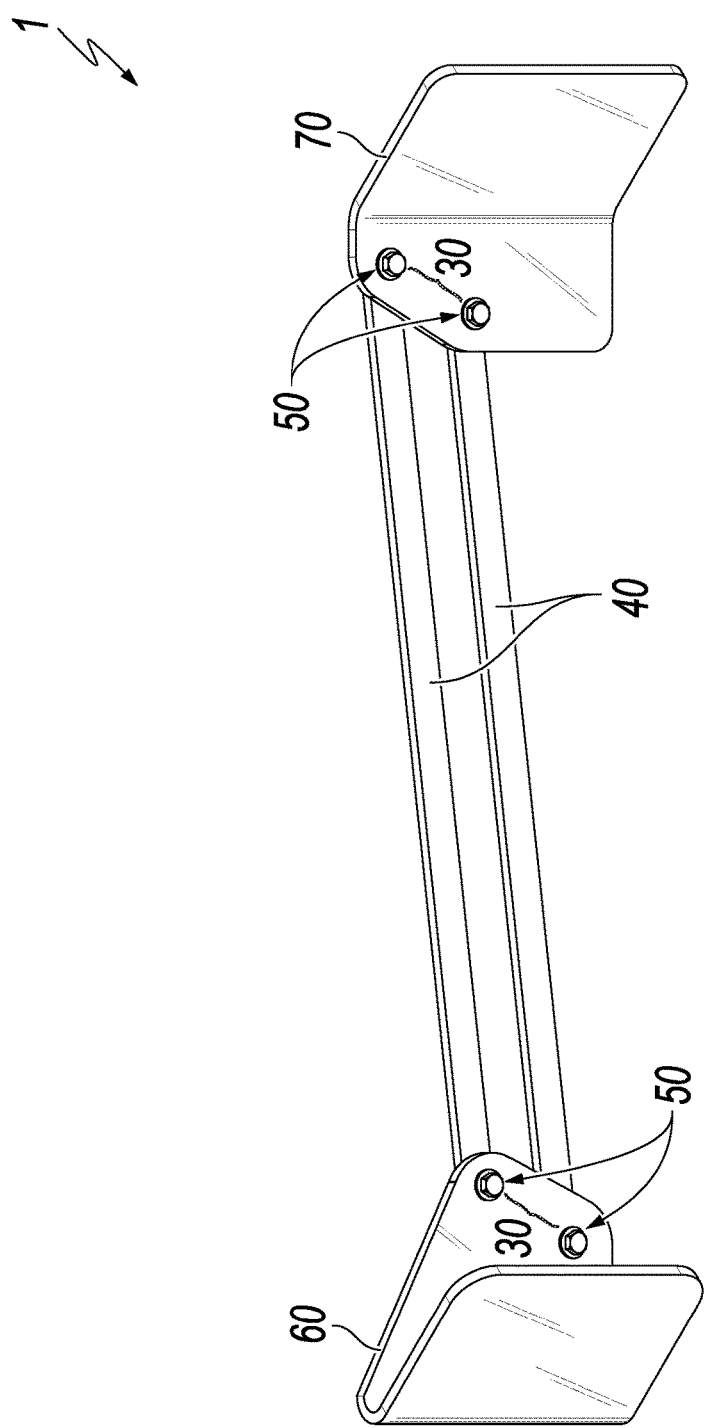
FIG. 2 is a top perspective view thereof, shown without a spring.
Figure 3:
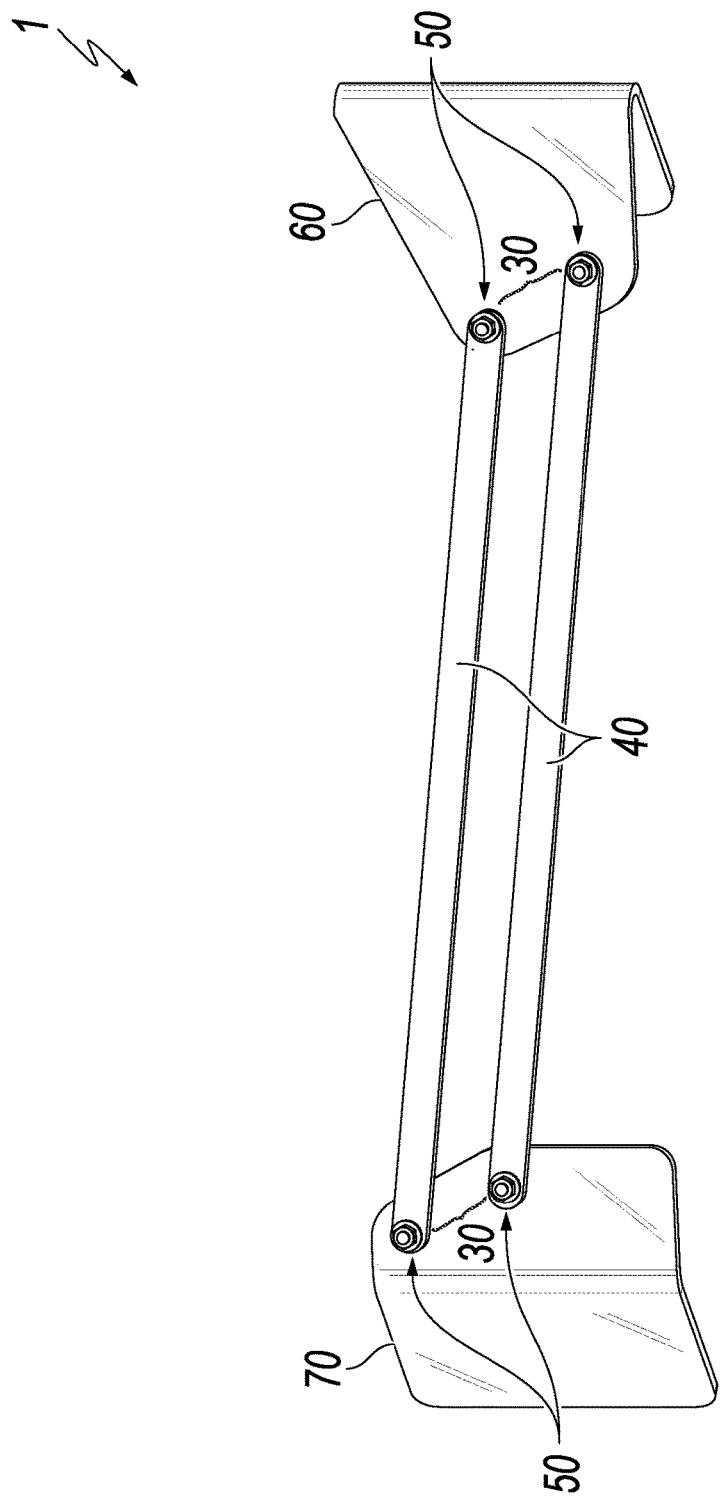
FIG. 3 is a second bottom perspective view thereof, shown without a spring.
Figure 4:
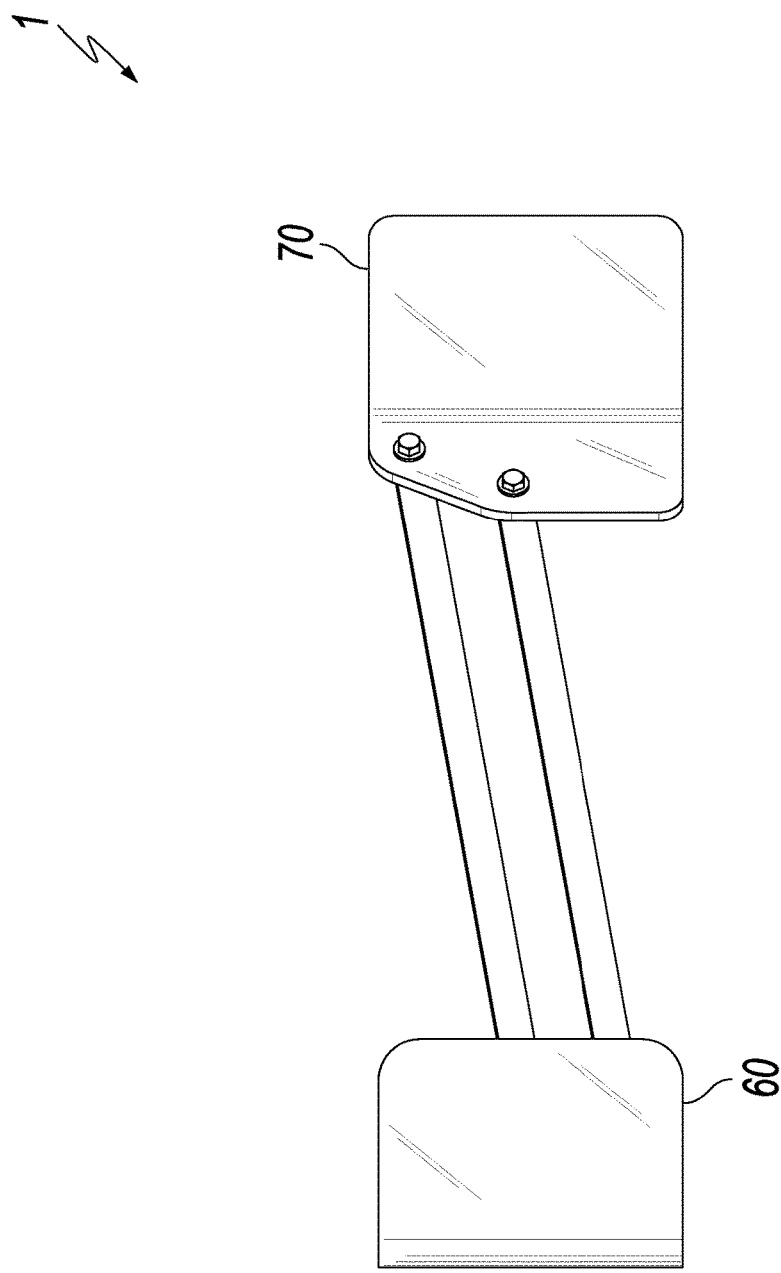
FIG. 4 is a front view thereof.
Figure 5:
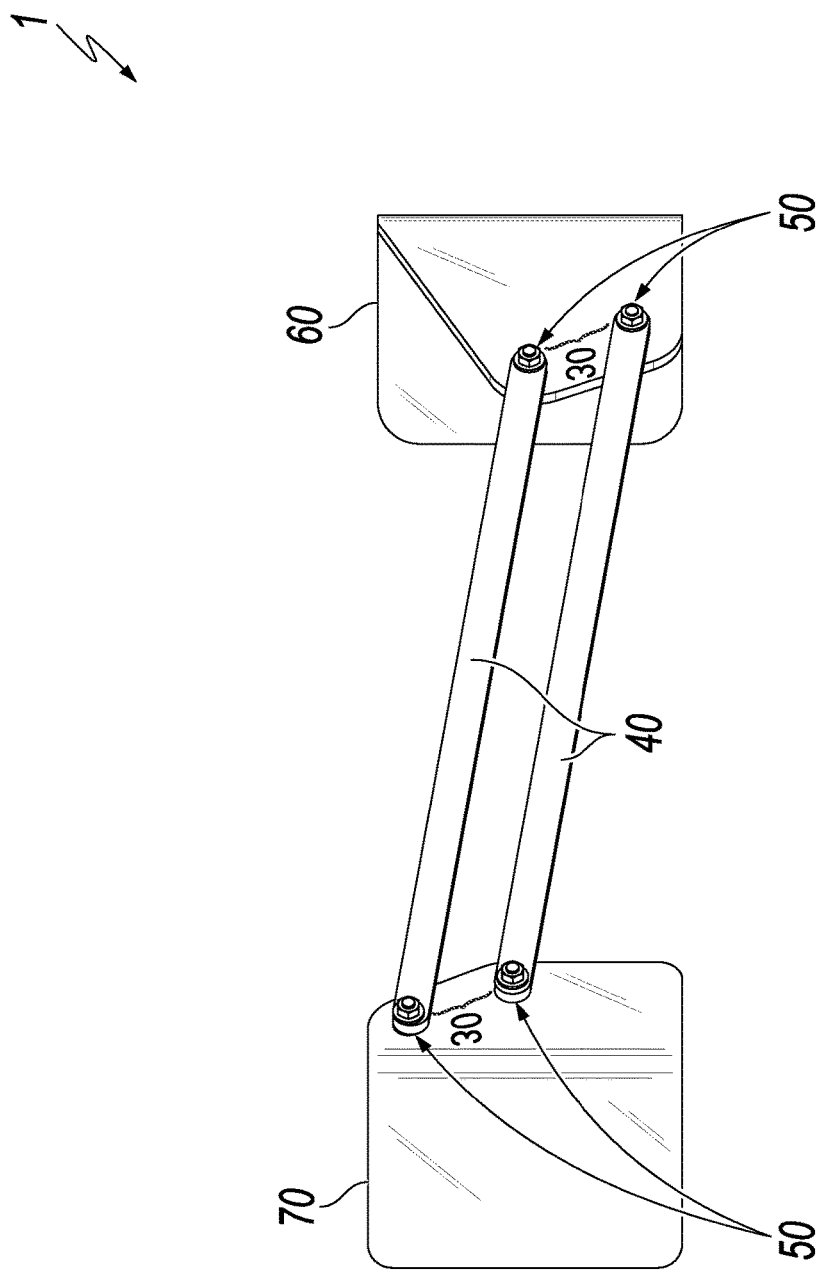
FIG. 5 is a back view thereof.
Figure 6:
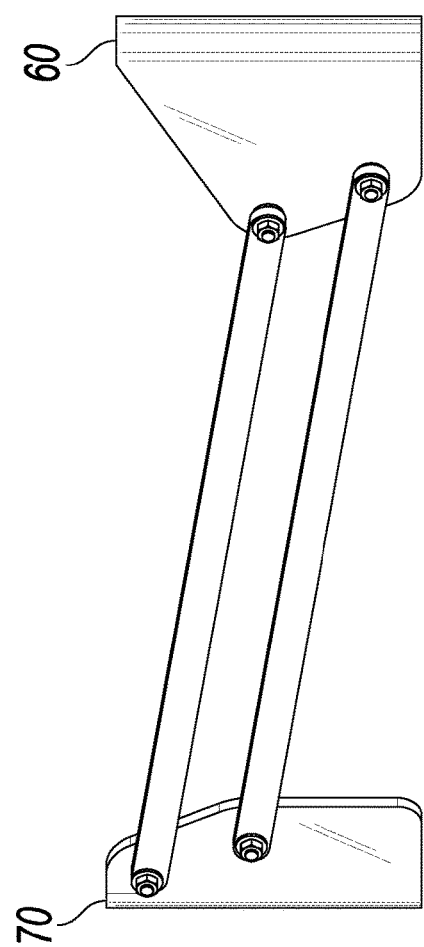
FIG. 6 is a right view thereof.
Figure 7:
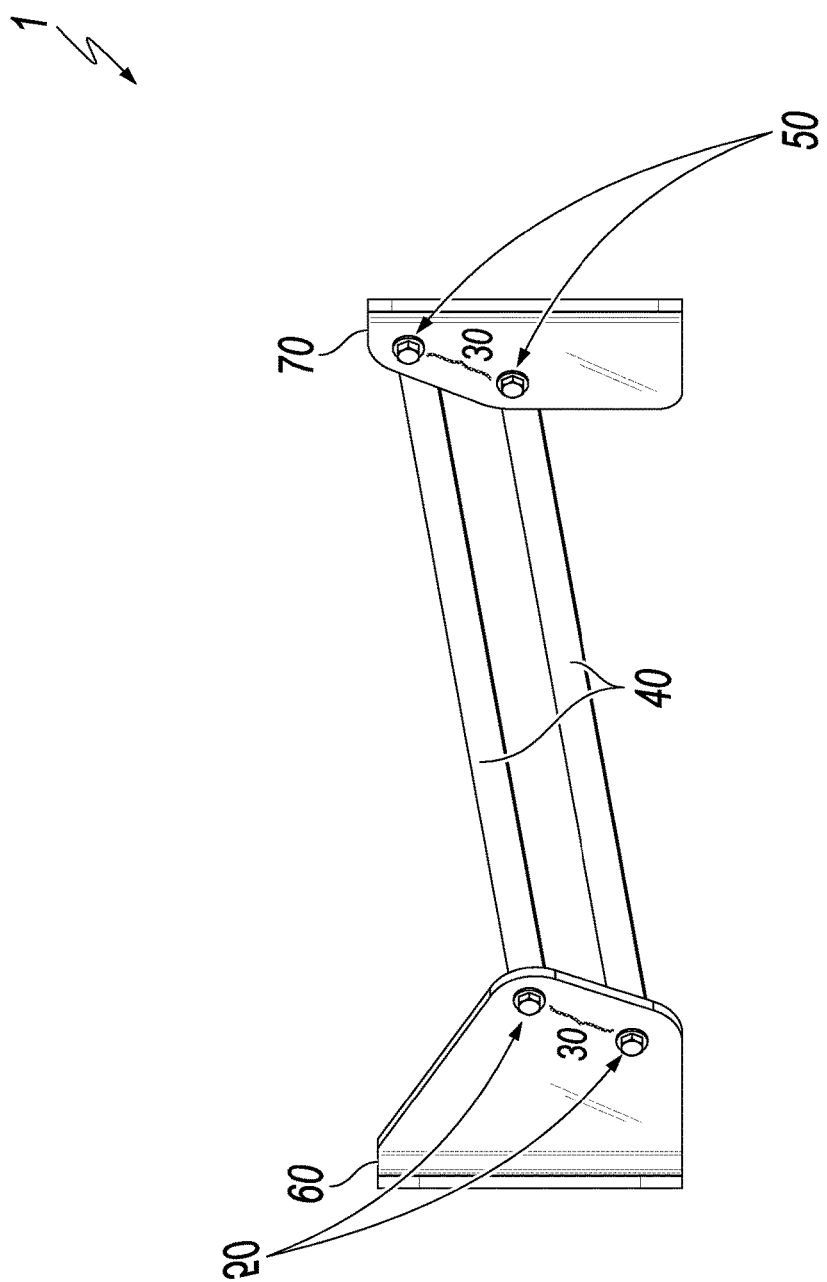
FIG. 7 is a left view thereof.

The ends and the arms are pivotally joined at four joints 50. Optional spring 80, shown in FIG. 1, connects two diagonal joints. FIG. 2 shows a top perspective view of this first embodiment, without spring 80. FIG. 3 shows a second bottom perspective view, similar to FIG. 1 except without a spring. Preferably, arms 40, bracket 60, bracket 70 are made of steel. Arms 40 range from 6.0 to 10.0 cm long and from 1.0 to 2.0 cm wide and from 5 to 10 mm in thickness. Brackets 60 and 70 range from 5.0 to 10.0 mm in thickness.

Figure 8:
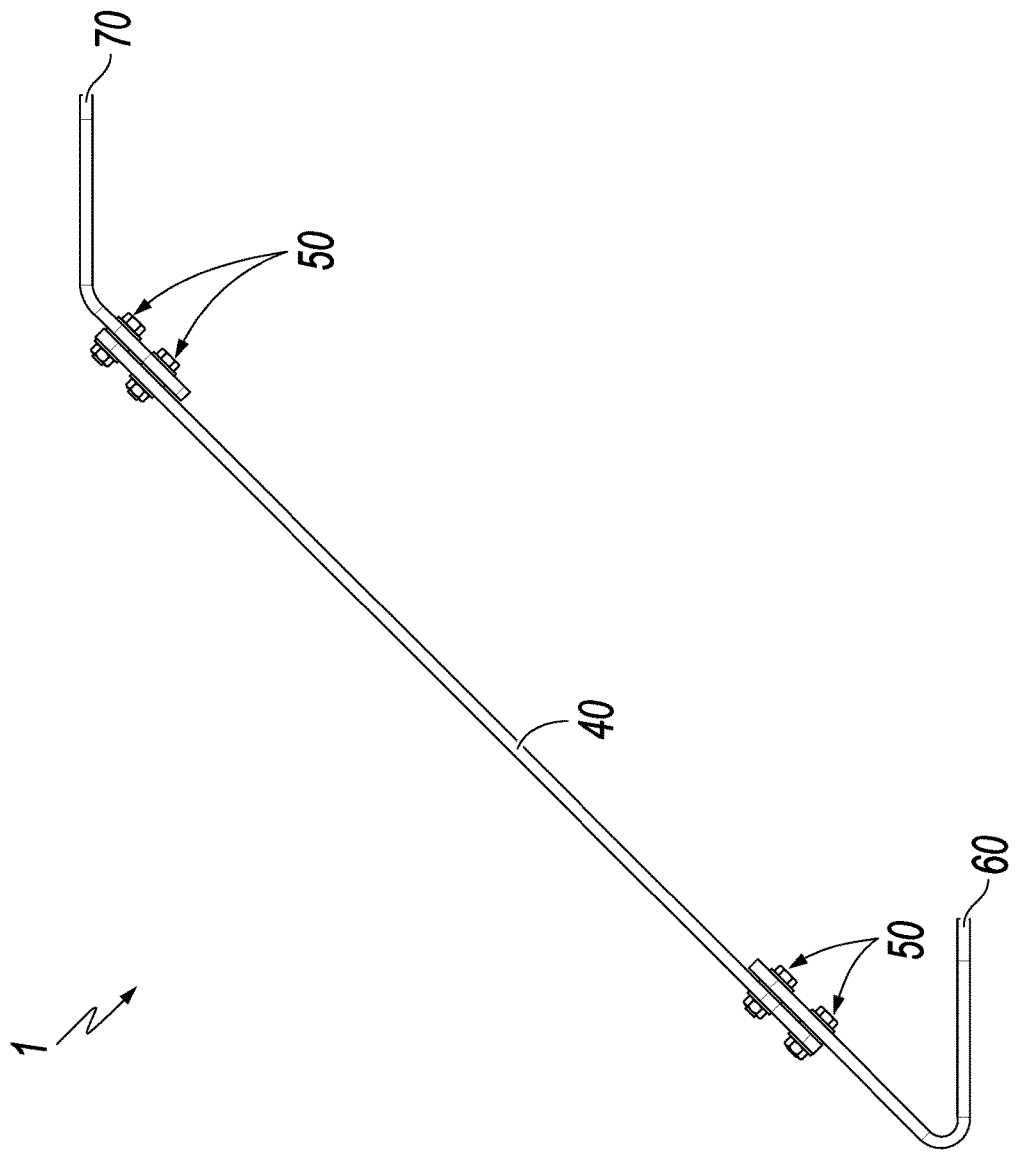
FIG. 8 is a top view thereof.
Figure 9:
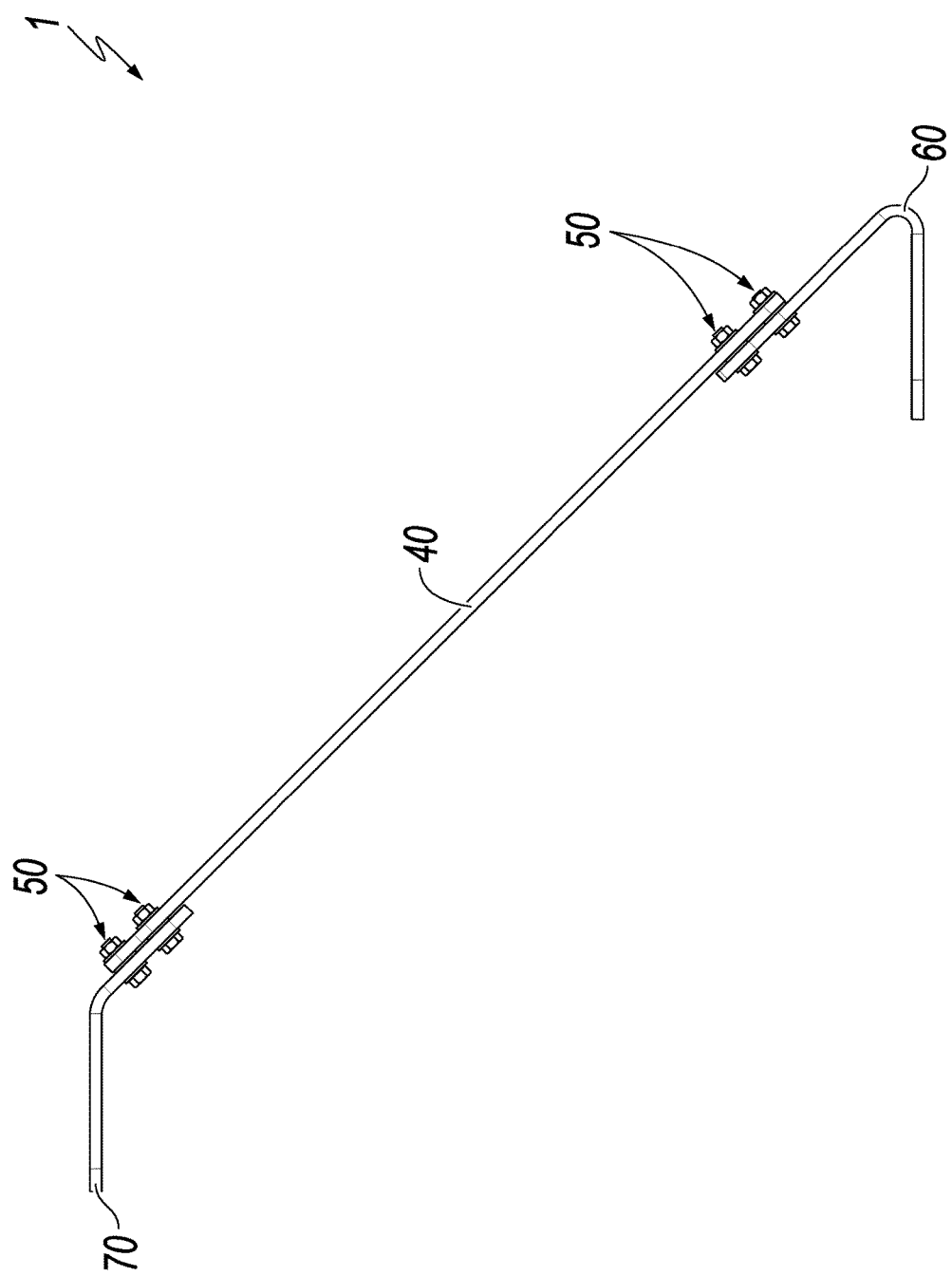
FIG. 9 is a bottom view thereof.

To create joints 50, I create holes in brackets 60 and 70, spaced apart distance 30. I also create corresponding holes the same diameter at the opposing extremities of each arm. The arms are fastened through these holes, using a fastener that can permanently attach the parts yet allow them to freely pivot. Preferably, each fastener comprises a bolt, a nut, and at least 4 washers (shown in FIG. 8 but not numbered).

Figure 10:
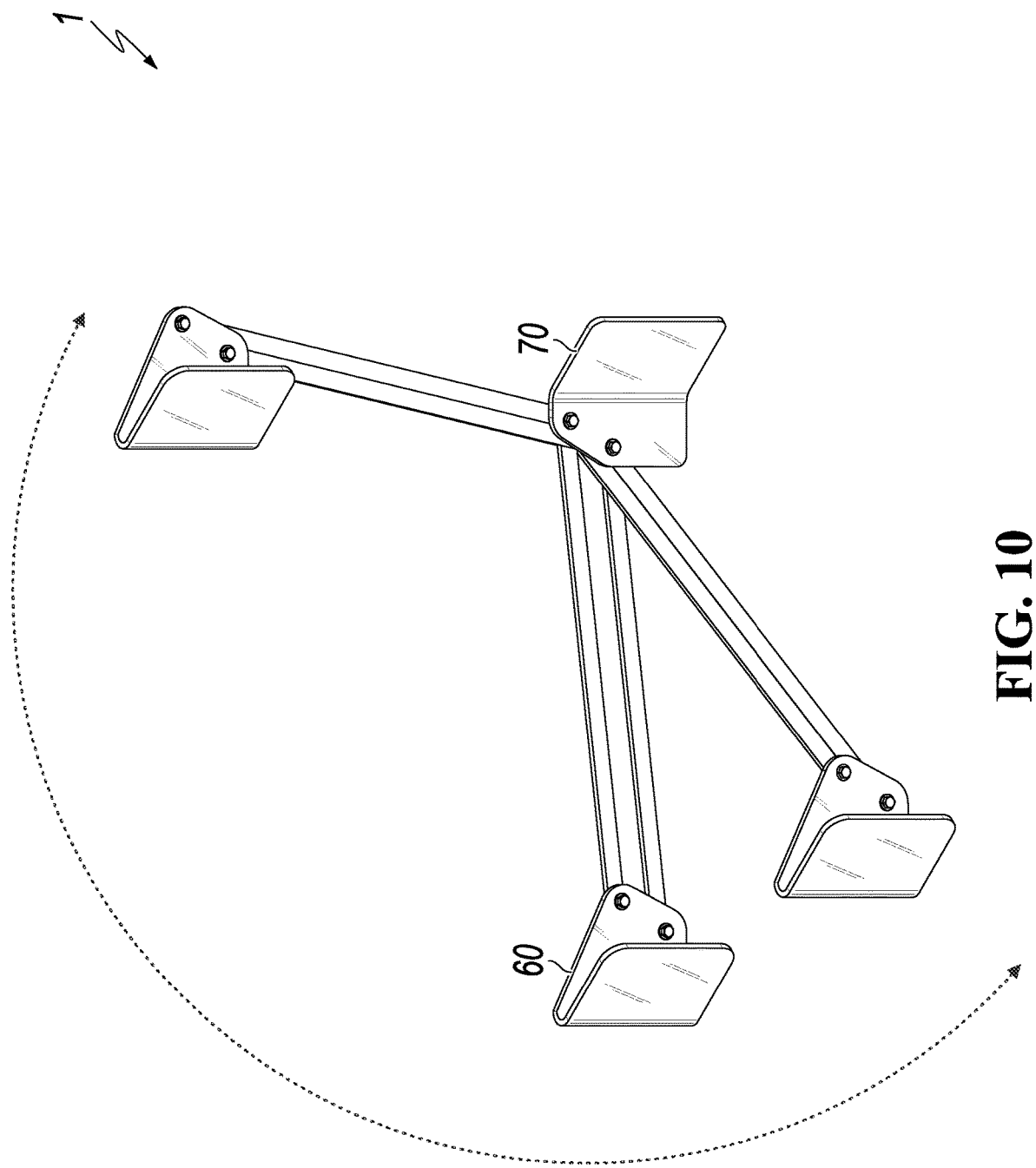
FIG. 10 is a top perspective view thereof showing range of movement in space.
Figure 11:
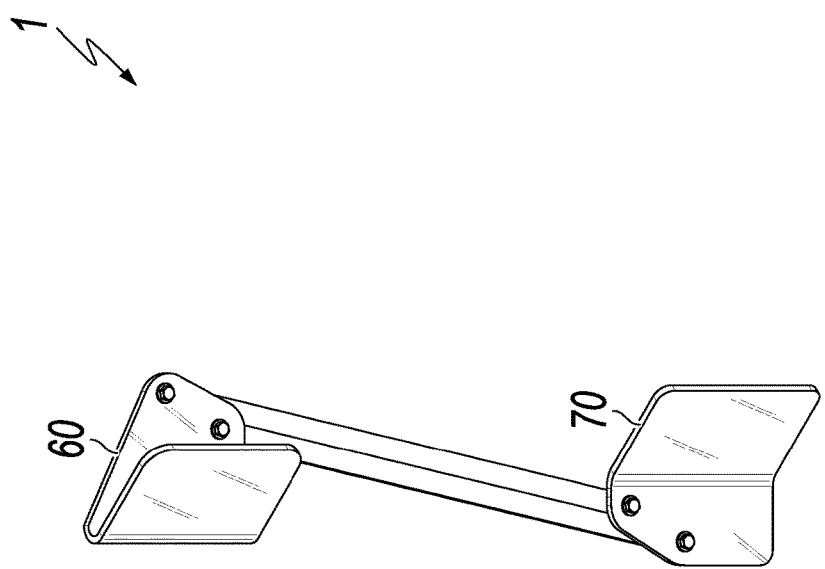
FIGS. 11-13 are top perspective views thereof showing three different positions in space.
Figure 12:
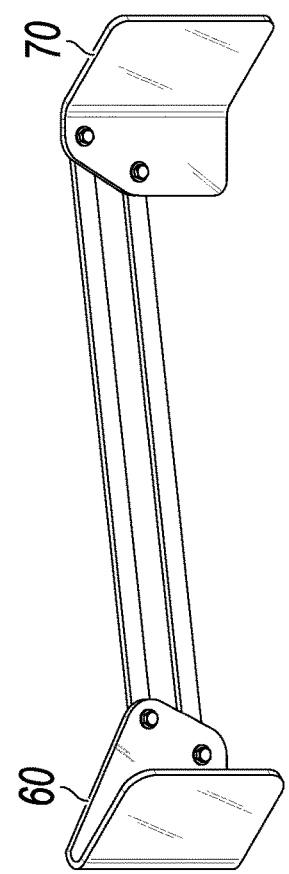
Figure 13:
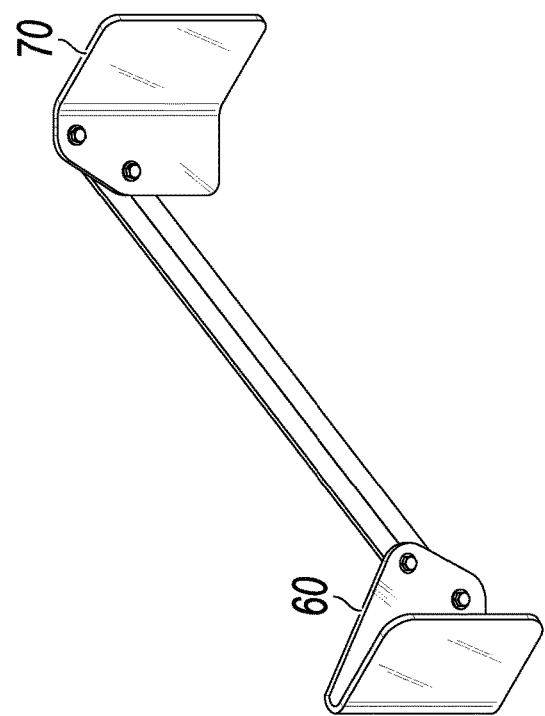

FIGS. 4-9 show various perspective views of a single hinge. FIG. 10 shows the range of motion of a single hinge, as obtuse bracket 70 is fixed in place. For simplicity, we show the hinge in three positions—top right, middle and lower left, and not attached to anything. Arms 40 (not numbered in these views) abut against each other at both the top right and the lower left positions, closing the vertical space between them. This firmly stops the movement of the hinge. In between those top and bottom hard stops, there are actually infinitely many middle positions. FIGS. 11-13 break apart this "animation" into individual steps. FIG. 11 shows the hinge in a top right position. FIG. 12 shows the hinge in an arbitrary middle position. FIG. 13 shows the hinge in a lower left position.

Figure 14:
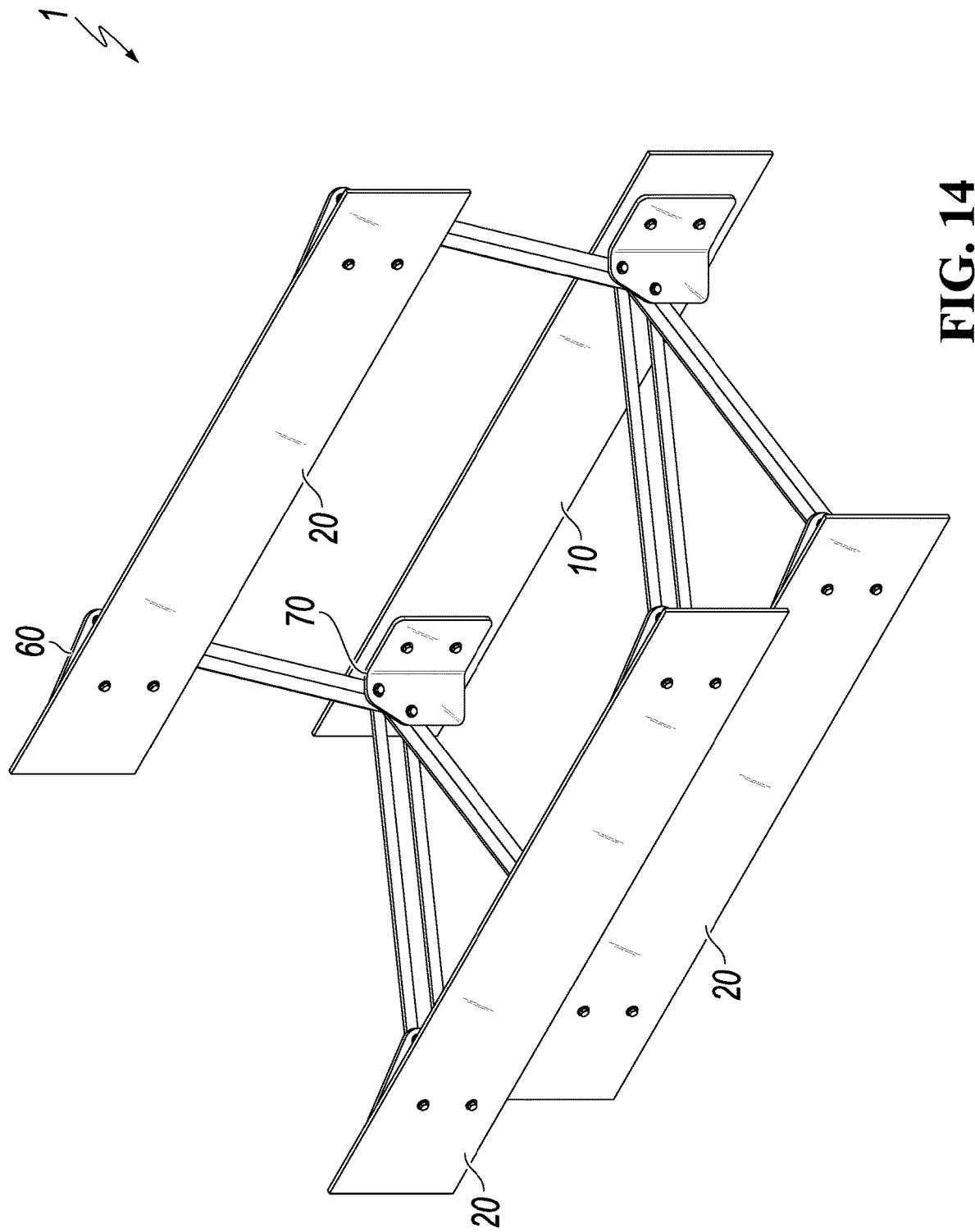
FIG. 14 is a top perspective view thereof showing a pair of hinges attached to each of two surfaces and showing range of movement in space.

FIG. 14 illustrates the range of motion when two identical hinges are attached in series to a first planar surface 10 and a second planar surface 20. While a single hinge can join and articulate two substantially planar surfaces, adding a second hinge further stabilizes the surfaces and smooths the arc of movement. This single illustration animates how surfaces 10 and 20 move relative to one another as surface 10 is fixed in place and surface 20 moves. For the pair of hinges to be attached in series, they must be spaced apart, and they must have an identically angled bracket attached to the same planar surfaces, facing the same direction. In these illustrations, note first obtuse bracket 70 on a left portion of the first planar surface 10 and second obtuse bracket (not numbered) on a right portion of the first planar surface 10. Note the measure of the two obtuse brackets is the same, and they open up in the same direction (facing the reader). Each hinge has its opposing acute angle bracket attached thereto, but the acute angle brackets are largely obscured in these views.

Figure 15:
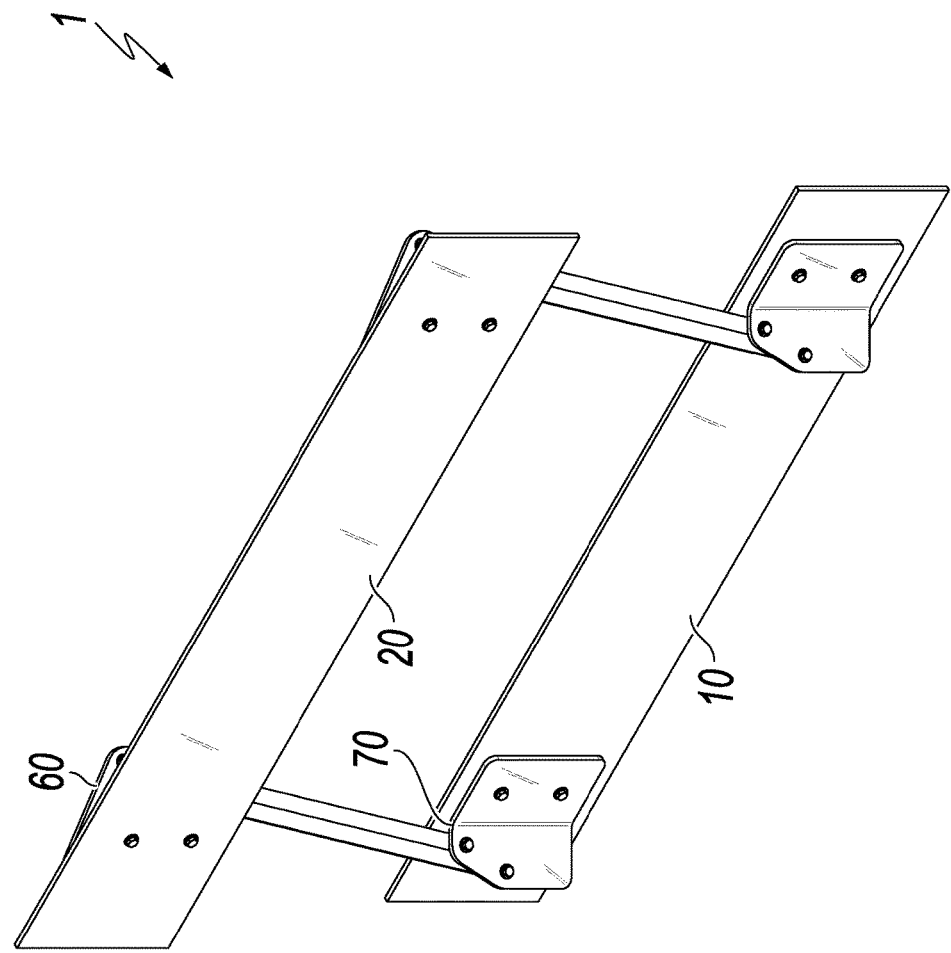
FIGS. 15-17 are top perspective views thereof, showing three different positions in space.
Figure 16:
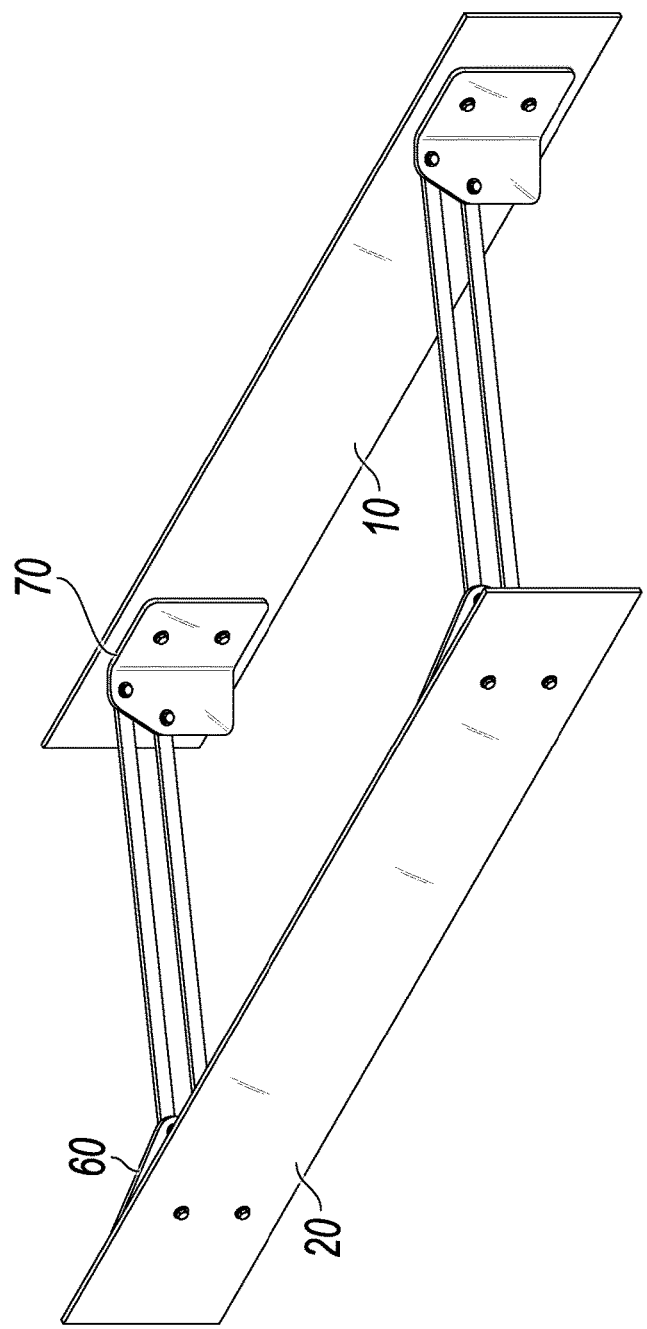
Figure 17:
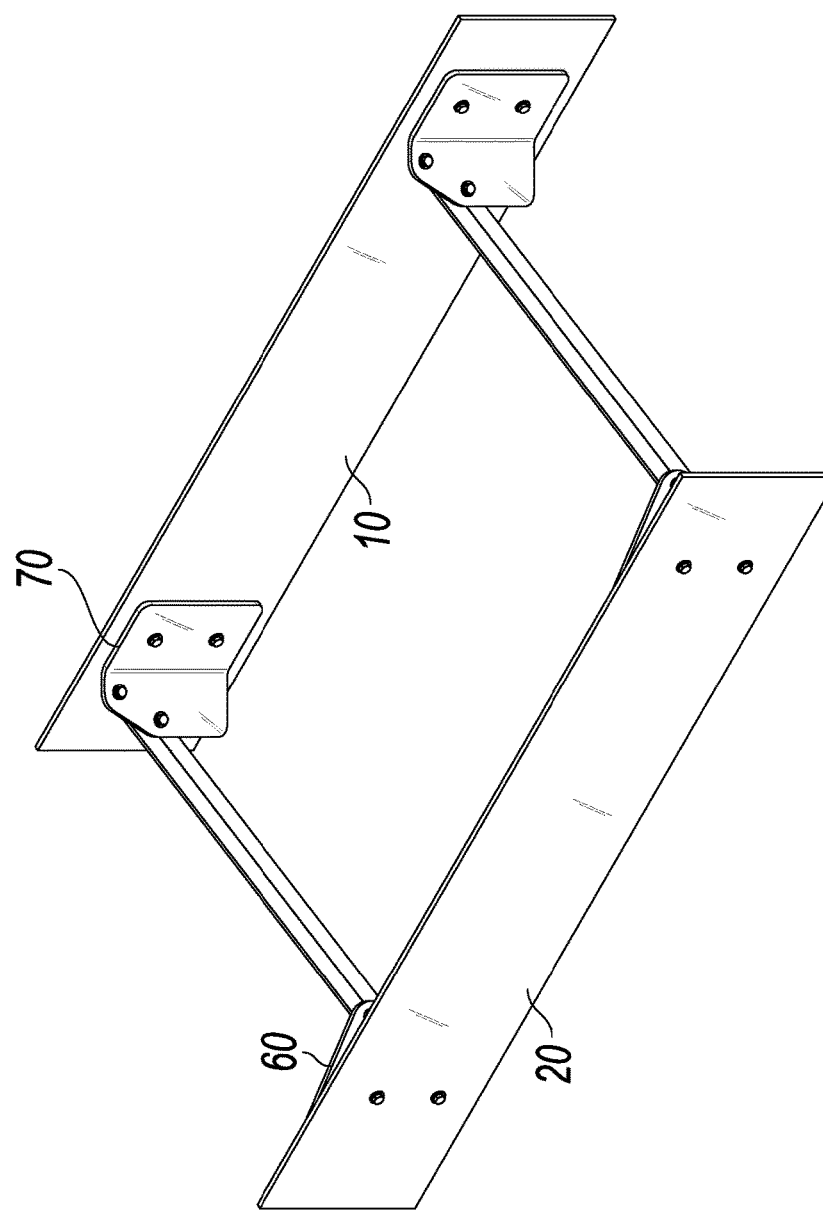

As with FIG. 10, I show the hinges in three positions—top right, middle and lower left. Arms 40 (not numbered in these views) abut against each other at both the top right and lower left positions to firmly stop the movement of the hinge. In between those top and bottom hard stops, there are, as shown with the single hinge, infinitely many middle positions. FIGS. 15-17 break apart this "animation" into individual steps. FIG. 15 shows the hinges in a top right position. FIG. 16 shows the hinges in an arbitrary middle position. FIG. 17 shows the hinges in a lower left position.

Figure 18:
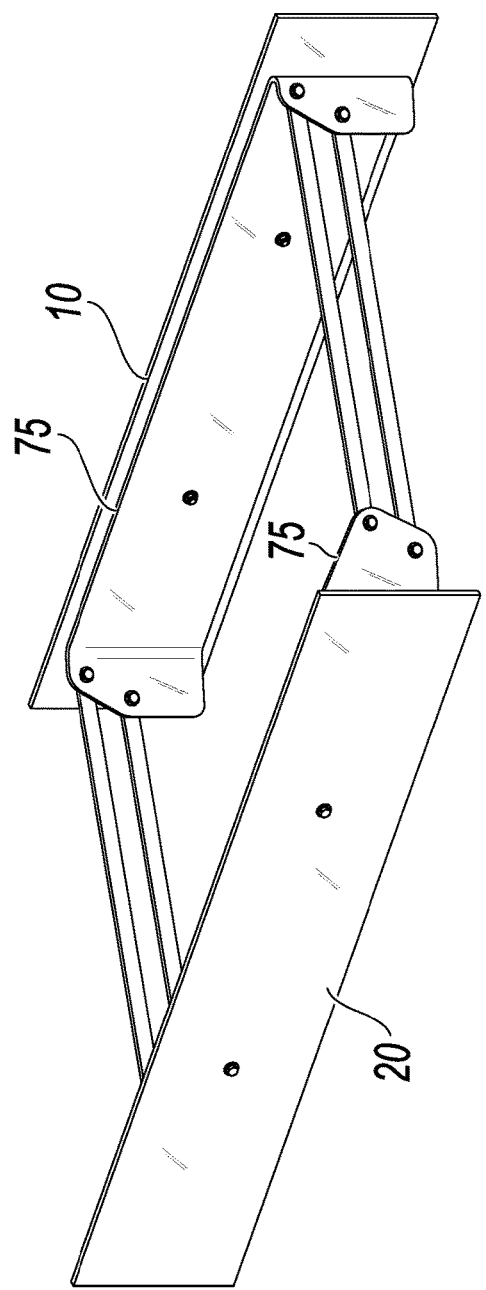
FIG. 18 is a top perspective view of a second embodiment of the invention attached to two surfaces.
Figure 19:
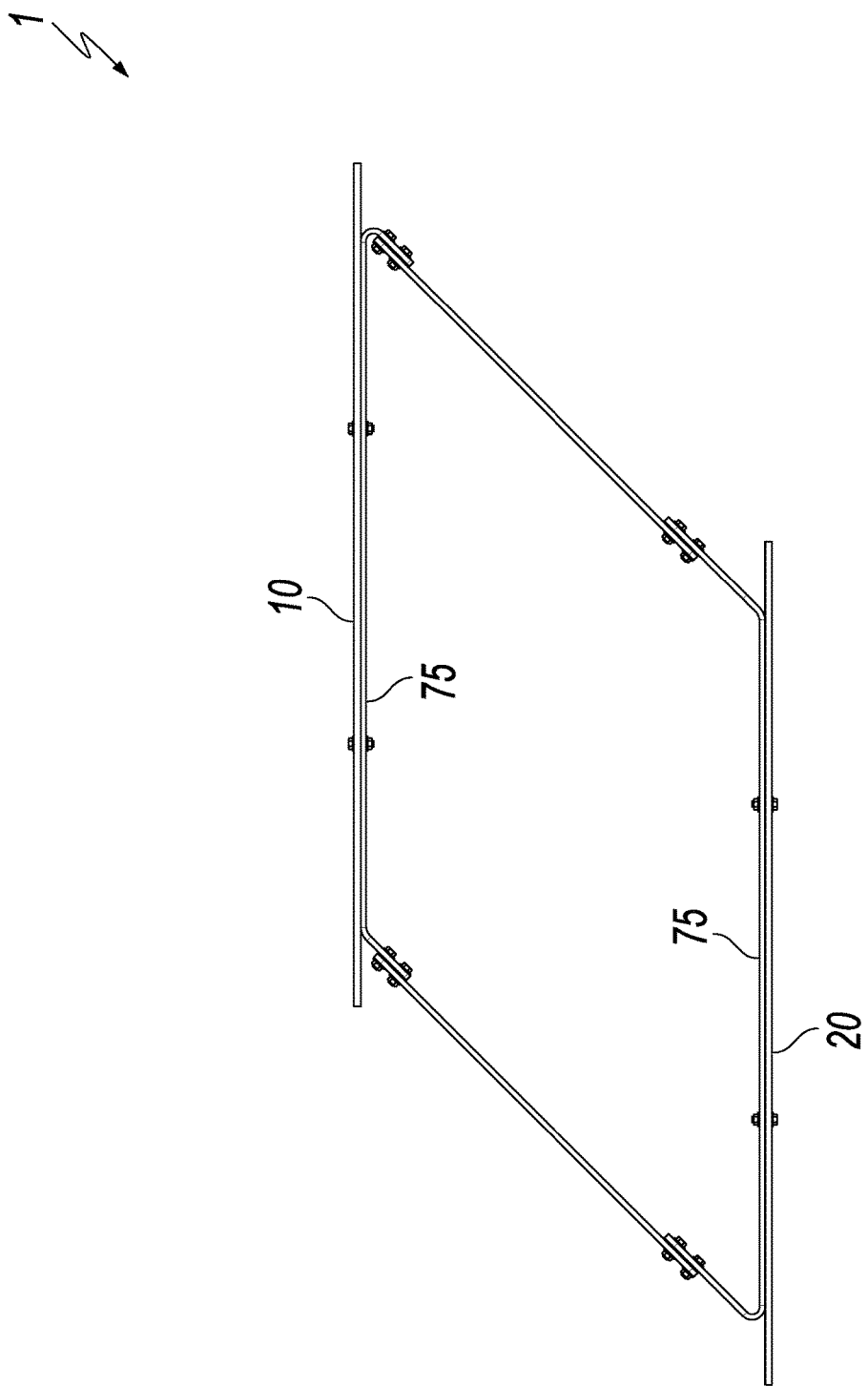
FIG. 19 is a top view thereof.

FIGS. 18-19 show in detail the second embodiment described above. In this second embodiment, we see the arms canted relative to the first surface 10 and second surface 20 at the same angle as in FIGS. 15-17. Unlike FIGS. 15-17 which use two separate hinges arranged in series, here we extended and blended the brackets attached to the same planar surface, into a unitary hybrid bracket 75. We attach a first unitary hybrid bracket 75 to the first planar surface 10. The first unitary hybrid bracket is bent at an obtuse angle toward the left of first planar surface 10 and bent at an acute angle toward the right of first planar surface 10. A second unitary hybrid bracket 75 is mounted onto the second planar surface, bent at an obtuse angle toward the right of the second planar surface 20 and bent at an acute angle toward the left (not visible) of the second planar surface. FIG. 19 shows a top view of the unitary hybrid bracket canting means which forms a parallelogram. The two obtuse angles are the same measure; the two acute angles are the same measure as well as supplementary to the obtuse angles.

Figure 20:
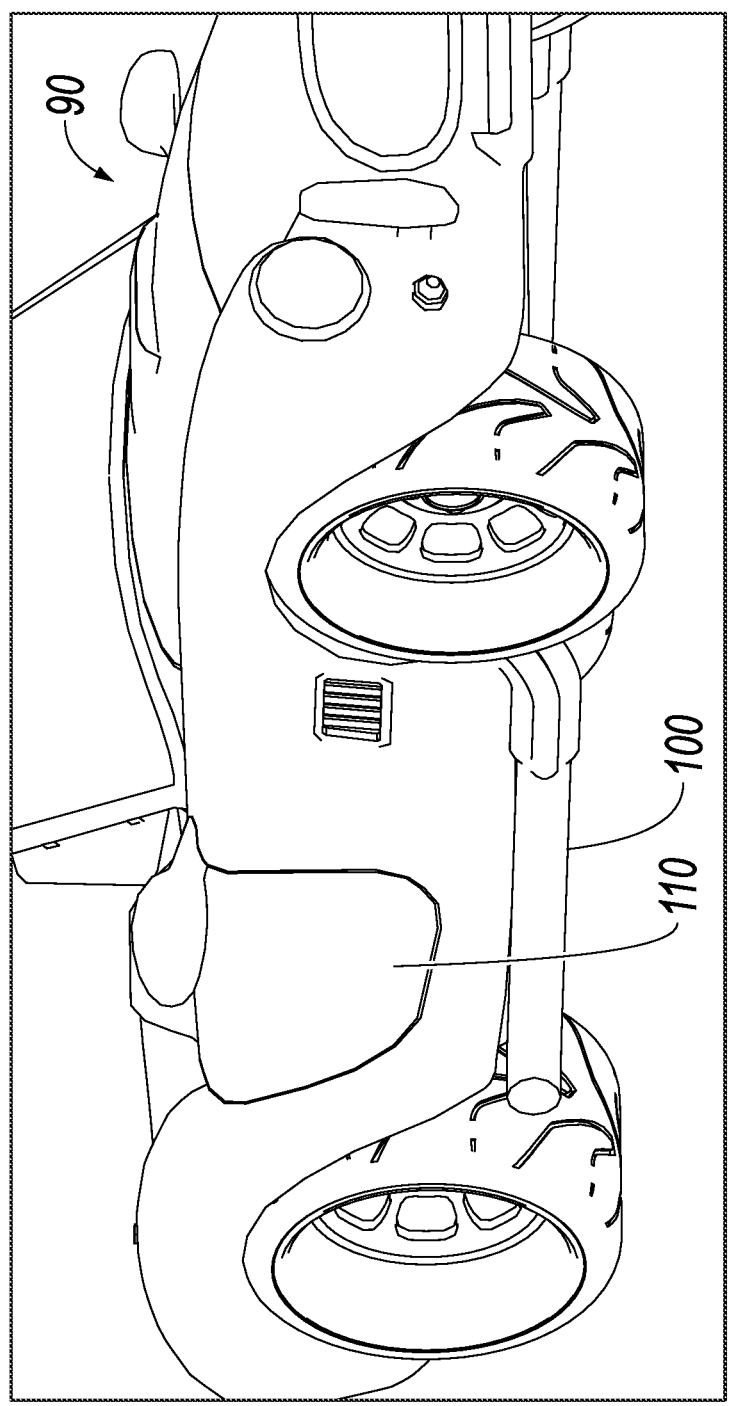
FIGS. 20-22 are front perspective views of the first embodiment of the invention, showing range of movement in space as installed on a car door and body.
Figure 21:
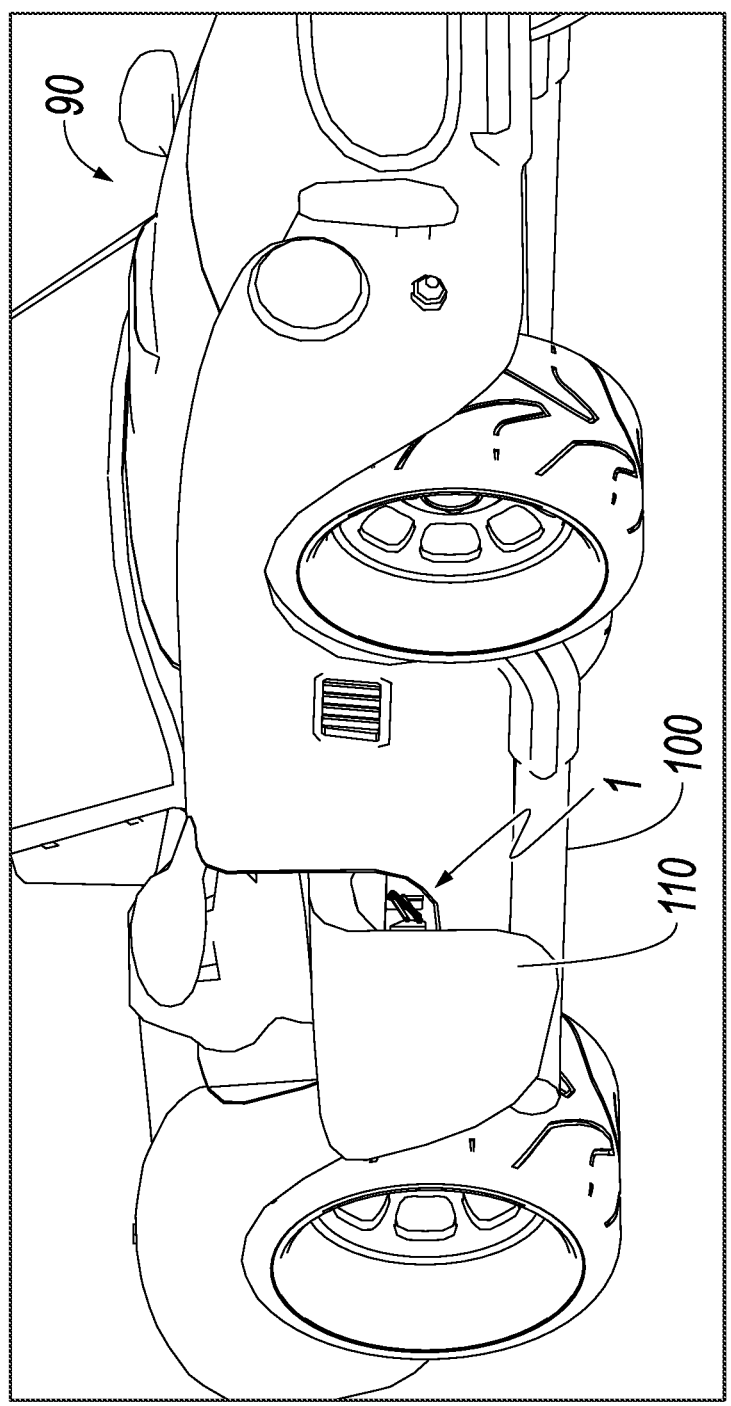
Figure 22:
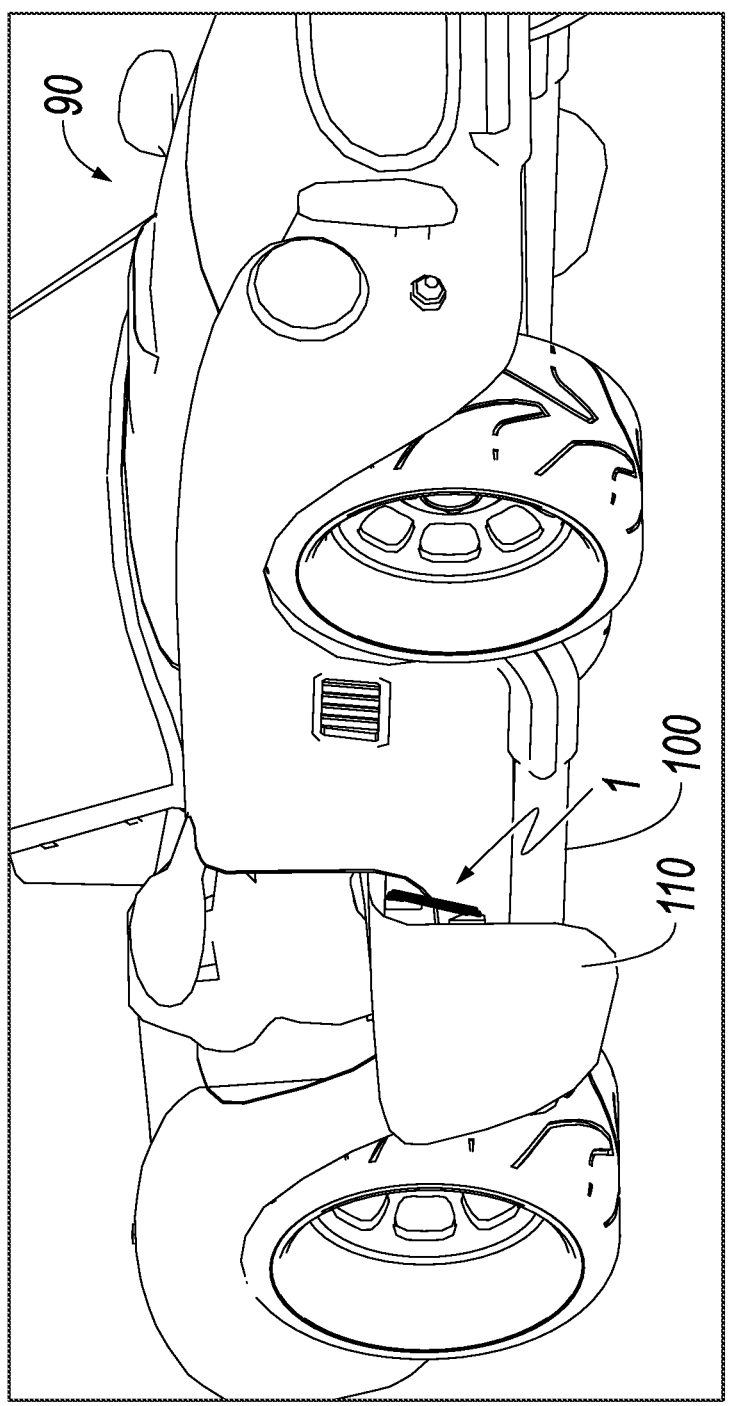
Figure 23:
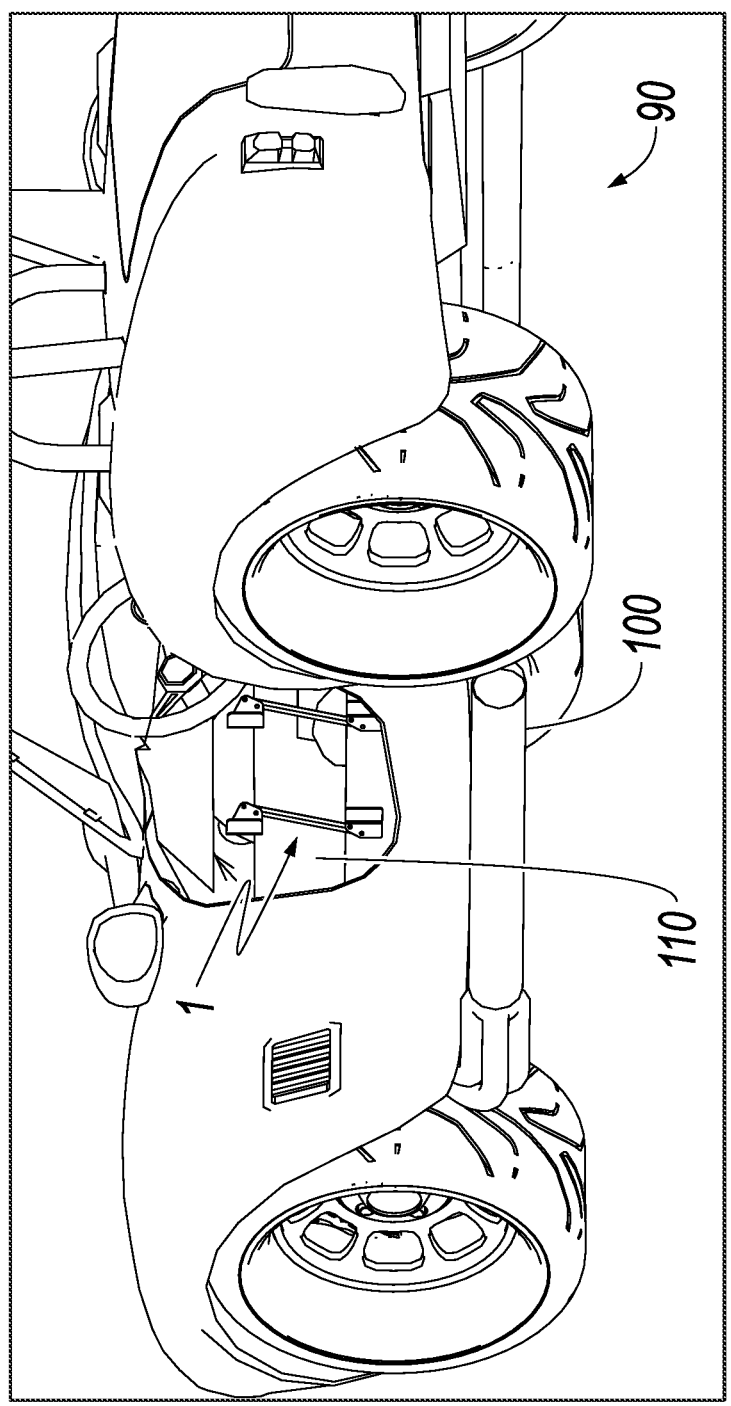
FIGS. 23-25 are back perspective views thereof, shown with the door removed.
Figure 24:
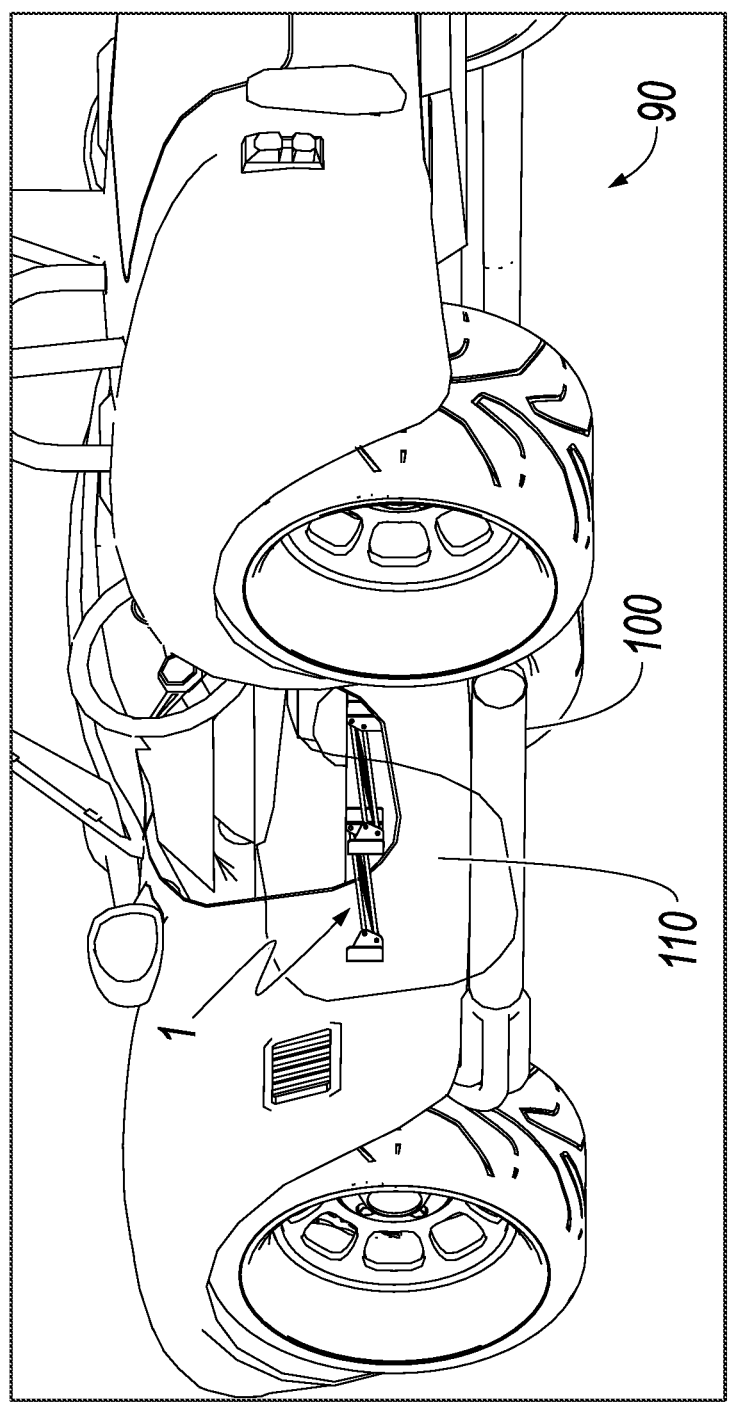
Figure 25:
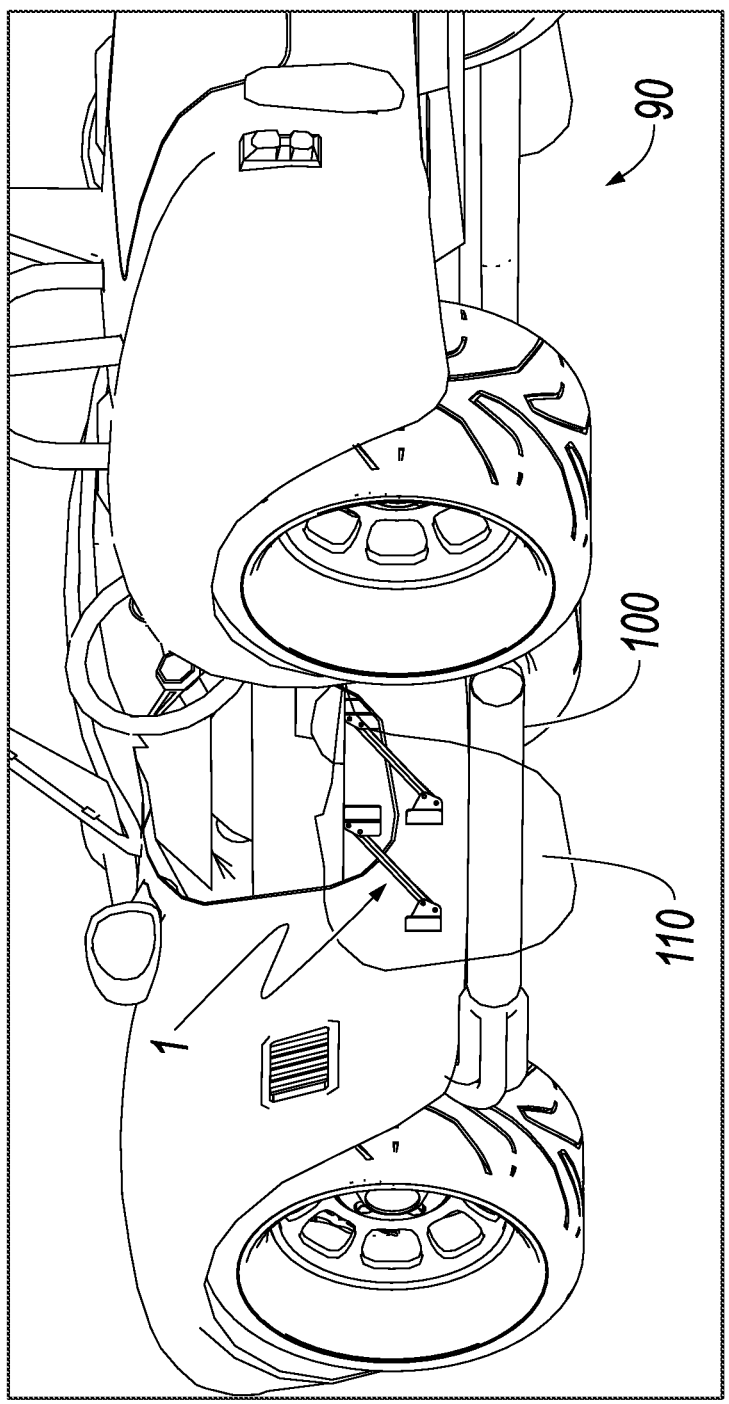
Figure 26:
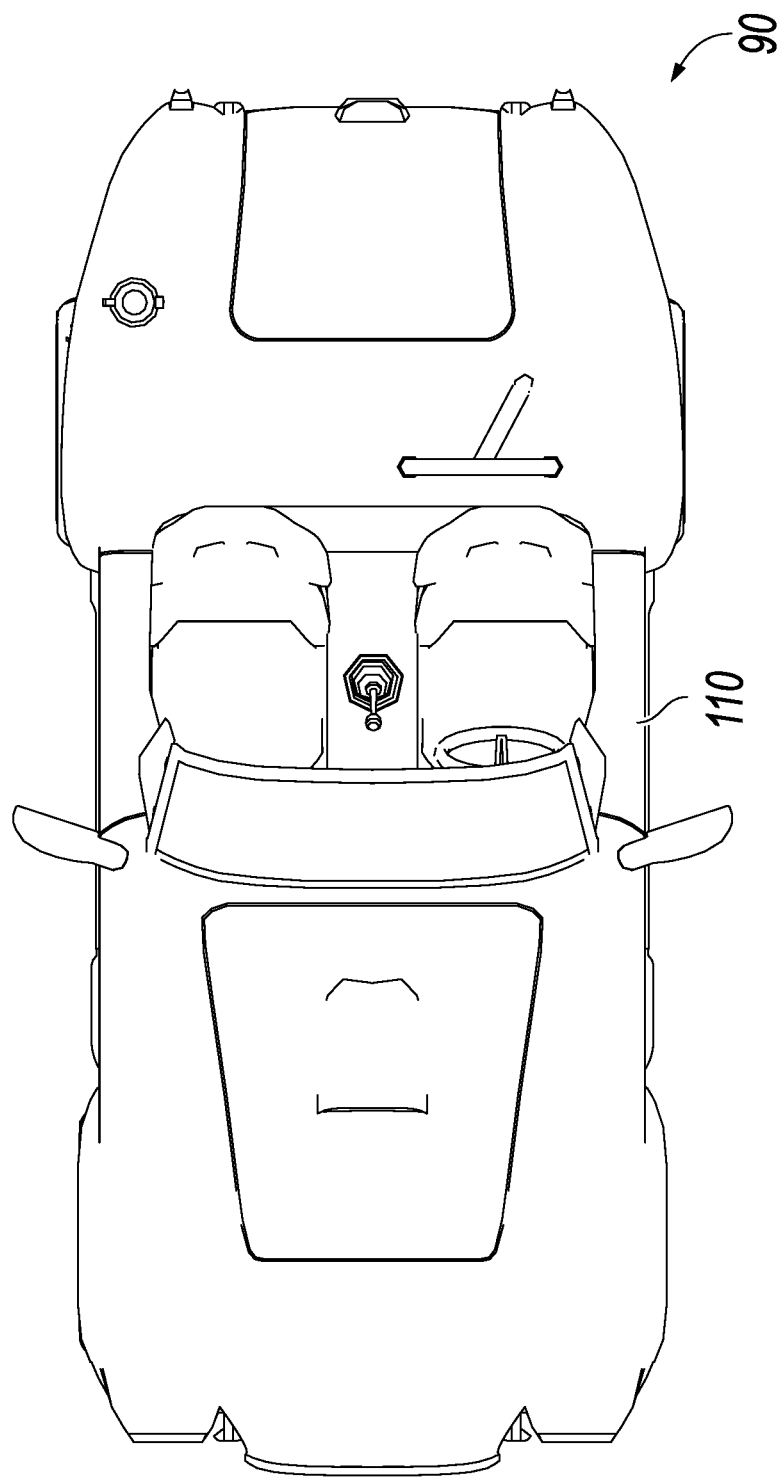
FIGS. 26-28 are top plan views thereof, shown with the door.
Figure 27:
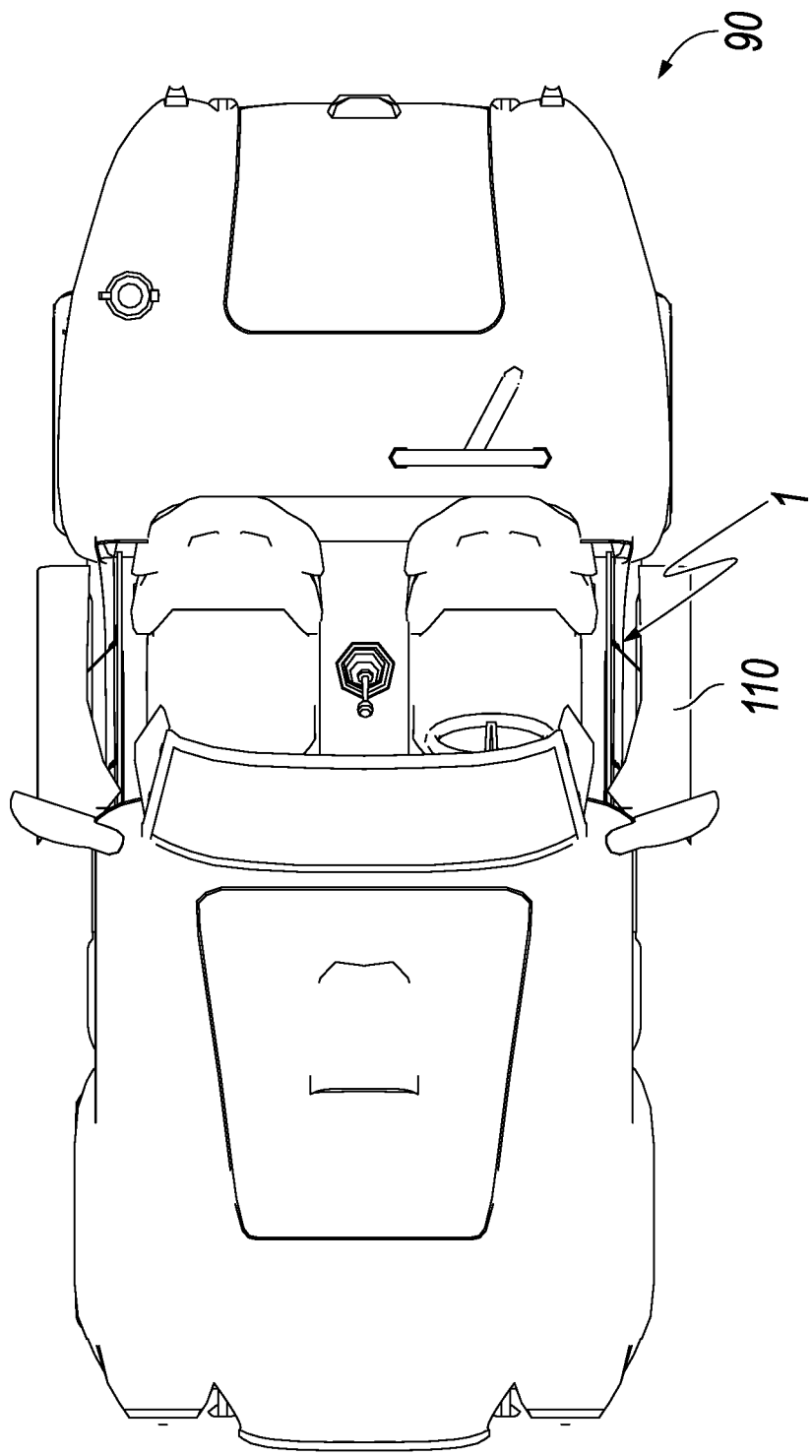
Figure 28:
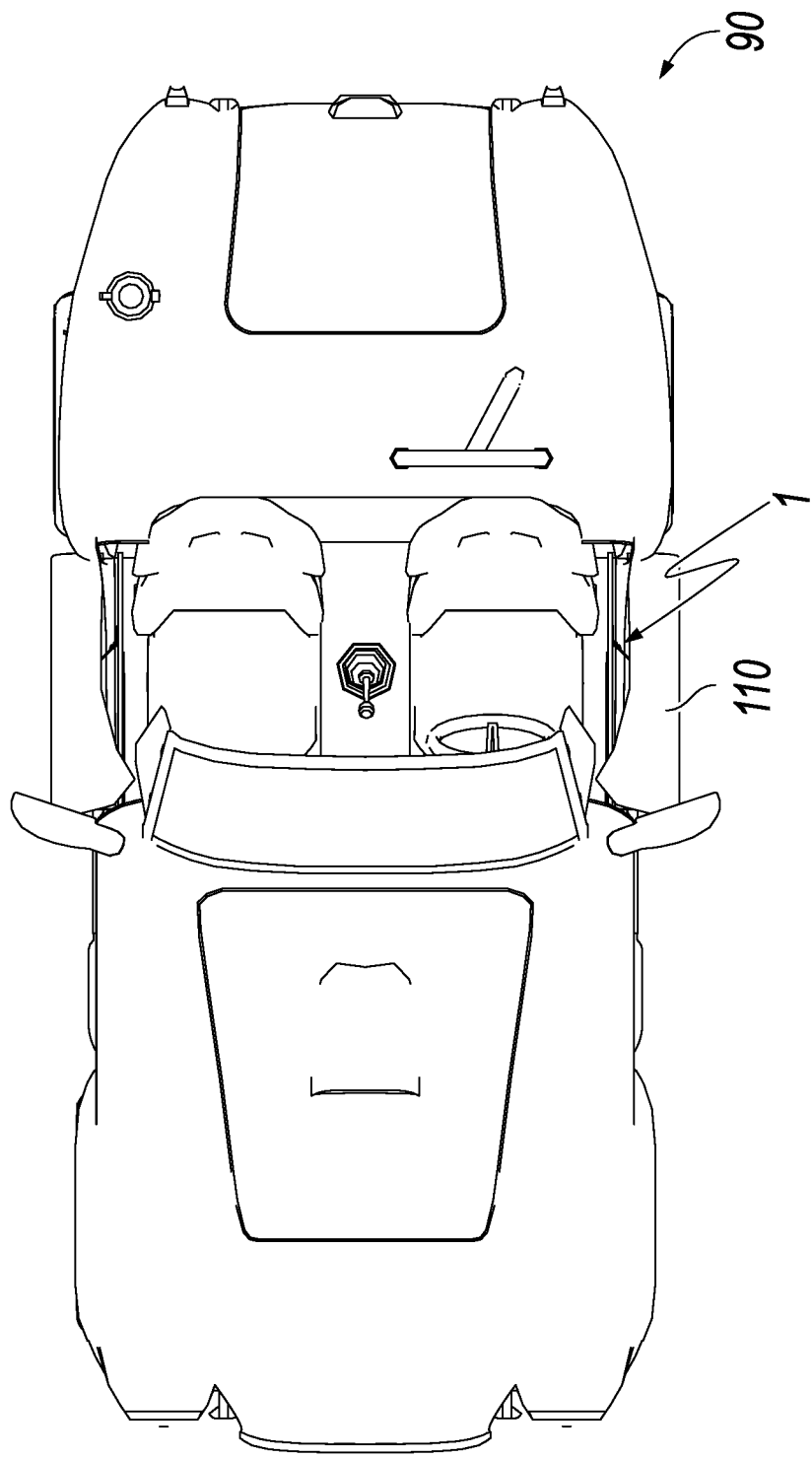

FIGS. 20-22 show how a pair of hinges of the first embodiment would look attached in series in an actual car, and how they move a car door arcwise over a side exhaust pipe. FIGS. 23-25 show detail of FIGS. 20-22, only with the door drawn in phantom to show the position of the hinges as the door moves outward and downward. Because the door is curved inward toward the body of the car, it physically covers the side exhaust pipe and gas. Any hot fumes the pipe emits is covered by the door while the door is in the furthest down position. Spring 80, shown in greatest detail on FIG. 1, slows and controls the downward motion of the door so the door moves under the pull of gravity in a more controlled manner. While the door is in this downward position, a person sitting in this car can easily step over the door. They need never touch the pipe or any hot exhaust gas.

Although embodiments and examples of the invention have been shown and described, it is to be understood that various modifications, substitutions, and rearrangements of parts, components, steps, as well as other uses, shapes, construction, and design of this apparatus and method can be made by those skilled in the art without departing from the novel spirit and scope of this invention.

The invention claimed is:

1. A hinge connecting a first substantially planar surface to a second substantially planar surface and simultaneously articulating those two surfaces outward, forward and downward relative to the first substantially planar surface, in an arc, relative to each other, this hinge comprising:
 a. a planar quadrilateral linkage with a pair of opposing ends and a pair of opposing arms, connected by four pivoting joints;
 b. means for attaching and canting the first end of the quadrilateral linkage at an acute angle relative to the first surface; and
 c. means for attaching and canting the opposing second end of the quadrilateral linkage at an obtuse angle relative to the second surface, this obtuse angle being supplementary to the acute angle.

2. The hinge of claim 1, wherein the acute angle attaching-and-canting means and the obtuse angle attaching-and-canting means comprise brackets.

3. The hinge of claim 1, wherein the acute angle attaching-and-canting means and the obtuse angle attaching-and-canting means comprise triangular prisms.

4. The hinge of claim 1, further comprising a downward displacement control means.

5. The hinge of claim 4, wherein the downward displacement control means is a spring.

6. The hinge of claim 1, wherein the quadrilateral linkage is a parallelogram.

7. The hinge of claim 1, wherein the quadrilateral linkage is a trapezoid.

8. The hinge of claim 1, wherein the first surface is an exterior face of a car body, and the second surface is an interior face of a car door.

9. A method of shielding the occupants of a car from heat generated by side exhaust pipes, this car having a body separating an interior space from an exterior space and positioned above the side exhaust pipes, comprising the steps of:
 a. cutting out a door from the car body, this door having a substantially planar bottom portion and a top portion curving inwardly toward the interior of the car;
 b. attaching and canting the first end of the hinge of claim 1 at an acute angle relative to the exterior face of the car body;
 c. attaching and canting the opposing second end of the hinge of claim 1 at an obtuse angle relative to the interior face of the car door;
 d. displacing the door outward, forward, and downward relative to the body, in an arc, such that the curving top portion of the door covers the side exhaust pipes and a bottom edge of the door remains above the ground; and
 e. stepping over the displaced door.

10. A method of simultaneously displacing a car door outward, forward and downward relative to a car body that separates an interior of the car from an exterior of the car, comprising the steps of:
 a. cutting out a door from the car body, this door having a substantially planar bottom portion and a top portion curving inwardly toward the interior;
 b. attaching and canting the first end of the hinge of claim 1 at an acute angle relative to the exterior face of the car body;
 c. attaching and canting the opposing second end of the hinge of claim 1 at an obtuse angle relative to the interior face of the car door; and
 d. displacing the door outward, forward and downward relative to the body, in an arc, such that the curved top portion of the door covers the side exhaust pipes and a bottom edge of the door remains above the ground.

* * * * *